United States Patent [19]

Ferguson

[11] Patent Number: 4,883,315
[45] Date of Patent: Nov. 28, 1989

[54] VISOR APPARATUS MOUNTED ON PROTECTIVE SEAT FOR CHILDREN

[76] Inventor: James L. Ferguson, P.O. Box 853, Monument, Colo. 80132

[21] Appl. No.: 207,736

[22] Filed: Jun. 16, 1988

[51] Int. Cl.⁴ .............................................. A47C 7/10
[52] U.S. Cl. ...................................... 297/184; 135/96
[58] Field of Search .................. 297/184; 135/900, 96; 403/363; 5/200 C, 201

[56] References Cited

U.S. PATENT DOCUMENTS

| | | | |
|---|---|---|---|
| 2,153,547 | 4/1939 | Charlop et al. | 135/96 X |
| 4,027,915 | 6/1977 | Anderson et al. | 297/184 |
| 4,030,748 | 6/1977 | Brock | 135/96 |
| 4,314,727 | 2/1982 | Potts | 297/184 |
| 4,583,779 | 4/1986 | Myers | 297/184 |

*Primary Examiner*—James T. McCall
*Attorney, Agent, or Firm*—Timothy J. Martin; J. Preston Oxenham

[57] ABSTRACT

A protective seat for children traveling in a vehicle is provided with a visor that shields a child from excessive incident light and from flying objects in the event of a collision or sudden stop. Preferably, the visor is constructed of transparent, high-impact plastic that is tinted to reduce the amount of sunlight that can pass therethrough. The visor is U-shaped to have a central portion extending transversely across the protective seat and a pair of downwardly depending end portions mounted by a trunnion pin hinge to the lateral side edges of the child support shell. The position of the visor is pivotally adjustable and position lock elements and limit stops may be provided. The visor may be formed as original structure on the protective seat or as a retro-fit apparatus including mounting brackets that may be fastened to the protective seat thus providing the visor mounts.

28 Claims, 6 Drawing Sheets

VISOR APPARATUS MOUNTED ON PROTECTIVE SEAT FOR CHILDREN

FIELD OF INVENTION

The present invention is directed to improvements in protective seats for children such as those which may be secured by the restraining belts of a vehicle and which receive and restrain a child during travel. Such seats, known as "car seats," protect the child from injury in case of a collision, a sudden stop or the like. Specifically, the present invention is directed to a visor apparatus mounted to such a car seat to protect the child against both incident sunlight, and against flying objects during a collision, sudden stop or the like. The present invention, as set forth herein may be an "add on" item to an existing protective seat or may be provided as as part of the original structure the protective car seat.

BACKGROUND OF THE INVENTION

As a result of recent statistics of traffic accidents, no one today questions the value of protective seats for children, which seats are used to restrain a child during travel. These car seats are manufactured in the form of a padded shell that receives and supports a child and a support framework for the shell. Typically the support shell comprises a seat portion on which the child sits, a back portion which supports the infants upper torso and head and a pair of lateral side edges which project upwardly and outwardly of the seat and back portions so that the support shell is somewhat cup shaped in configuration to receive and support the child. The framework and shell may be secured by the normal restraining belts of the vehicle, such as seat belts and shoulder harnesses. Once secured, an infant or young child may be placed in the car seat and a child restraining harness on the protective seat may then be placed across the child and releasably locked into the position. In the event of a sudden stop or collision, the child restraining harness keeps the child in the protective seat apparatus and the protective seat apparatus, in turn, is retained by the restraining belts of the vehicle. So successful have these protective seats been in preventing injuries of children, that many governmental bodies have passed legislation mandating the use of such protective seats.

Despite the tremendous advantages of protective car seats, a disadvantage arises due to the fact that the child is restrained in a single position. Incident light, primarily sunlight, may thus shine directly on the child during operation of the vehicle. Since the child can not get away from the sunlight, the child may become quite uncomfortable and indeed may experience injuries to the eyes or to the skin by way of sunburn. Further, even though the protective seat apparatus significantly diminishes the chance of injury to the child, it is still possible that loose objects located within the passenger compartment of the vehicle may become missiles during a sudden stop or collision, and these objects may strike the head, face or other body portions of the child. Accordingly, there remains a need for improvements to protective seats for children that enhance the safety of the seat and which increases the comfort of the child placed therein.

SUMMARY OF THE INVENTION

It is an object of the present invention to provide a new and useful visor constructed either as part of a protective infant seat during initial manufacture thereof or that may be retro-fitted onto an existing child's protective seat.

It is a further object of the present invention to provide a visor on a protective sheet that helps shield a child against the impact of flying objects in the passenger compartment of the vehicle during sudden stops, collision, and the like.

It is a still further object of the present invention to provide to visor for a protective seat which does not significantly obstruct the view for a child placed within the protective seat yet which protects the child against incident light, such as sunlight.

Yet another object of the present invention is to provide a visor for a protective seat which visor acts as a sun visor as well as a shield against flying objects during sudden stops and collision and which visor is further adjustable in position to accommodate children of differing sizes, and to accommodate different angles of sunlight.

The present invention, then, is directed to an improvement in an existing protective seats used to protect a child during travel in a vehicle wherein this improvement may be included either as an originally manufactured part of the protective seat or as a retrofit item for existing protective infant seats. In its broad form, this improvement comprises a visor having a central portion and an opposite end portions which are fastened by mounts to either support shell or framework of a protective seat whereby the central portion of the visor extends across the support shell in spaced apart relation thereto so that the central portion is positioned over an infant over a child placed in the protective infant seat. This visor is constructed of a high impact plastic material that is preferably transparent but which is tinted or coated to reduce the amount of incident light which is transmitted therethrough. Preferably, the end portions are secured to the lateral side edges of the support shell of the protective infant seat either by mounting elements such as trunnion pins defined by bolt ends projecting outwardly from the lateral side edges of the support shell or by means of an auxiliary bracket carrying such mounting structures. This bracket is, in turn, securable to the lateral side edges of the support shell of the existing protective infant seat.

In the preferred embodiment, structure is provided to permit selective orientation of the visor at different angular positions relative to the support shell and to the child placed therein. Locking elements, such as star gears, locking posts and like may be provided to lock a visor at the selected orientation. Preferably, the central portion of the visor is in the form of a rectangular panel having a length approximately the same as the transverse width of the support shell, and the end portions of the visor are formed integrally with the central portion each at an obtuse angle with respect thereto so that the end portions have distal ends spaced apart from one another a distance greater that the transverse width of the support shell. The visor is formed of resilient material so that the end portions may be deflected towards one another when mounted to the protective seat whereby the visor is placed in tension.

As noted, brackets may be employed as part of the present invention to attach the present visor to existing protective infant seat wherein the support shell of the protective infant seat has lateral side edges formed by a marginal web. The mounting bracket is thus constructed to grip a portion of the marginal web of the lateral side edge portions of the support shell and includes a bracket surface that abuts a surface of a marginal web. These butting bracket and web surfaces may be provided with gripping structure to increase the engagement between the bracket and web either in the form of scoring or in the form of an adhesive layer sandwiched there between. A lower limit stop may be provided to limit the proximity that the central portion of the visor may be moved towards the seat portion thereby prohibiting the visor from tilting downwardly to pinch or bind the hands and arms of the child placed in the infant seat.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

Figure 1:
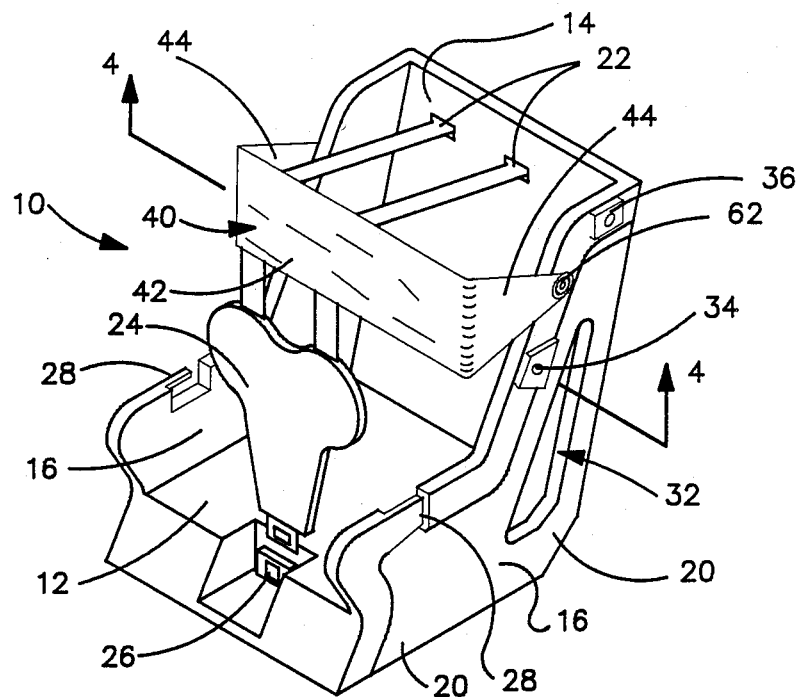
FIG. 1 is a prospective view of a child protective seat with a visor according to the first embodiment of the present invention.

The present invention is directed to improvements to protective seats for children which are used to protect a child in a vehicle during travel. Accordingly, the present invention may preferably be provided as part of a protective seat as originally manufactured, but also may be constructed as a retro-fit assembly for existing car seats. Thus, the present invention finds usefulness as an improvement over existing protective seats for children. As shown in FIG. 1, a protective seat 10 is provided with the improvement according to the present invention as an item of original manufacture.

In FIG. 1 protective seat 10 is formed as a support shell having a seat portion 12, a back portion 14 and two lateral side edge portions 16. This shell so formed is supported on a support surface, such as a car seat, by means of a support framework 20, all as is known as the art. Protective seat 10 is provided with harness restraint including belts 22 which are adjustable and extend through back portion 14 and which are connected to a body pad 24 that may be releasably latched in front of seat portion 12 by means of a latch assembly 26. Belt restraints 22 and body pad 24 are adapted to extend over a child received in and supported by the protective seat. Protective seat 10 includes a pair of slots 28 formed in lateral side edge portions 16 with these slots 28 being adapted to receive standard belt restraints of a vehicle, such as seat belts and shoulder harnesses. A pair of openings, such as representative opening 32, are formed in support framework 20 with openings 32 adapted to receive the belt restraints of a vehicle. Thus, slots 28 and openings 32 allow both forward facing and rear-facing positioning of protective seat 10. It should be understood that the forgoing description is a specific representation of one type of protective seat for children but that other protective seats generally follow this structural organization there also within the scope of the present invention.

Figure 3:
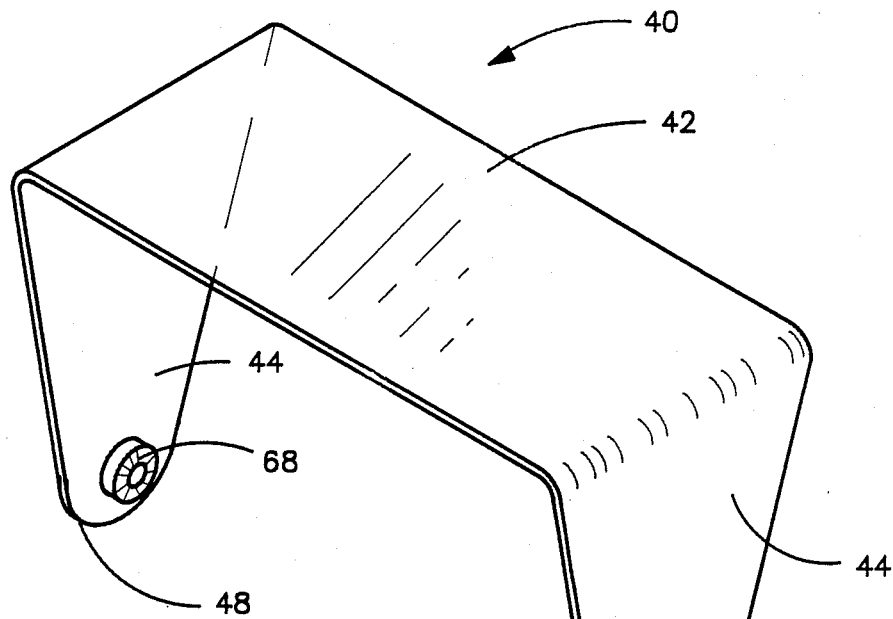
FIG. 3 is a prospective view of the visor imployed in the car seat shown in FIG. 1.
Figure 4:
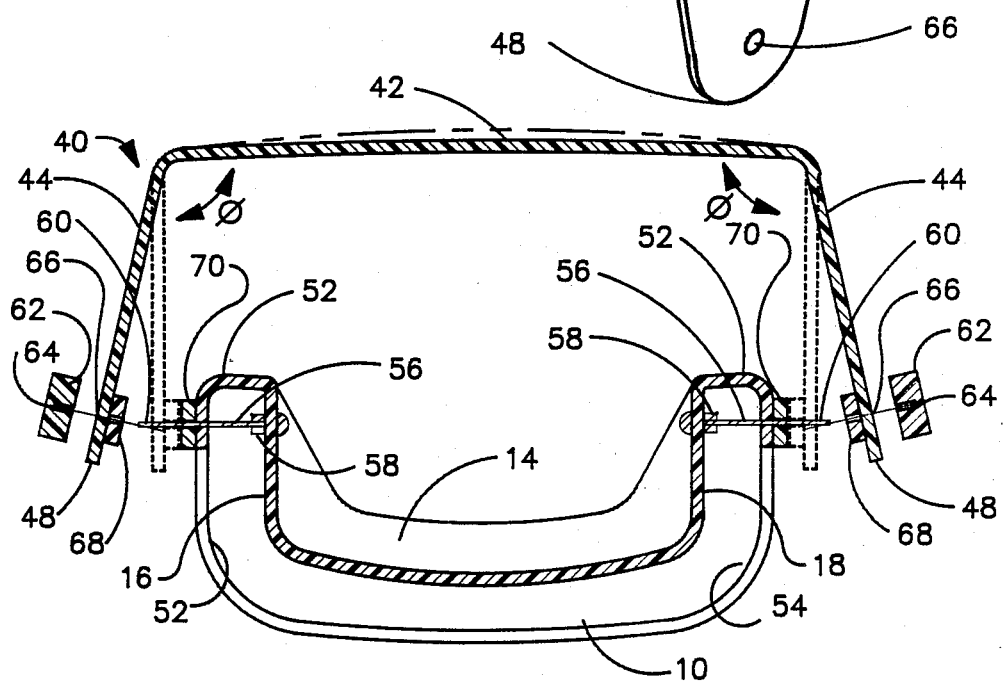
FIG. 4 is a cross-sectional view taken about lines 4—4 of FIG. 1 except showing the visor in a detached condition.
Figure 5:
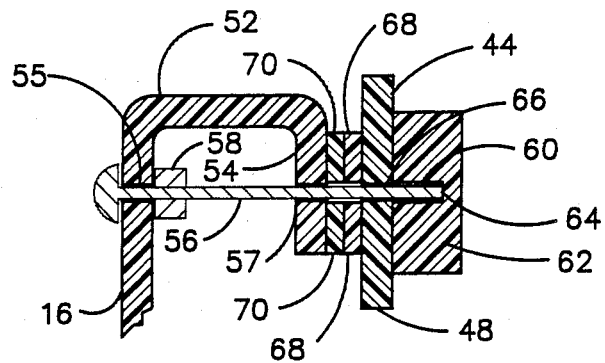
FIG. 5 is an enlarged cross-sectional view showing the attachment of one end portion of the visor of FIG. 1.
Figure 6:
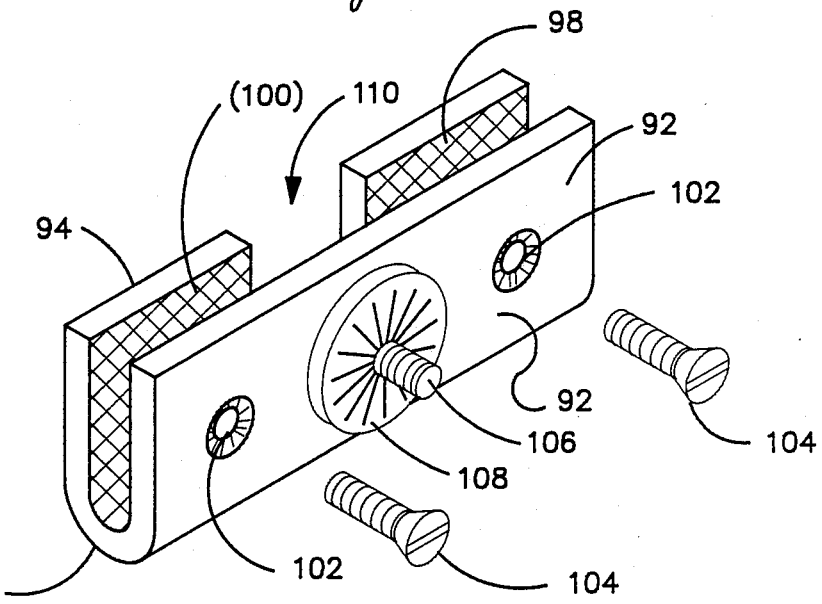
FIG. 6 is a prospective view of a bracket assembly used to attach the present invention to an existing car seat.

According to the present invention, protective seat 10 is improved by the addition of a visor 40 which has a central portion 42 and a pair of opposite end portions 44 which are mounted to respective lateral side edge portions 16. Visor 40 is best shown in FIGS. 3 and 4, and the mounting of visor 40 to protective seat 10 is best shown in FIGS. 4 and 5. In these figures, it may seen that central portion 42 of visor 40 is preferably formed as a rectangular panel having a length approximately the same as the width of the support shell of protective seat 10. End portions 42 are formed as integral angular extensions of central panel 42 that respectively terminate in distal ends in 48. Preferably, visor 40 is constructed of a high impact, relatively shatter proof plastic material that can withstand severe impacts without shattering or splintering. Further, it is preferred that visor 40 be constructed of a transparent material so as not to significantly obstruct the view of a child received in the protective seat, and it is further preferred that this plastic material be tinted with a light absorbing dye so as to reduce the amount of incident light passing therethrough, much in the manner of sunglasses. One such suitable material is that sold under the trademark Lexan by General Electric Co. of Pittsburgh, Pennsylvania, USA. An alternative to tinting visor 40 is to coat it with a light reducing film which may be a tinted film or polarizing film, as is known in the art.

As is best shown in FIG. 4, central portion 42 of visor 40 is slightly bowed and each end portion 44 is formed at a small obtuse angle φ of approximately 110° so that distal ends 48 are spaced apart a distance slightly greater than the width of the support shell. When mounted on protective seat 10, end portions 44 are deflected towards one another so as to place central portion 42 in tension, as is shown in phantom in FIG. 4. As may be seen in FIGS. 4 and 5, lateral side edges 16 terminate in reverse curve flanges 52 each provided with a downwardly depending web 54. A mounting post for a respective end portion 42 is provided with these mounting posts being in the form of elongated threaded bolts 56 which are mounted through flange 52 by means of nuts 58 and terminate in exposed free ends 60 which form a trunnion pin hinges to mount visor 40. Ends 60 of bolts 56 project in opposite directions outwardly of protective seat 10, and a large mounting nut 62 may be threadably received on end 60 of each bolt 56 in order to secure visor 40 thereon. To this end, end portions 44 are each provided with a mounting hole 66 located adjacent its distal end 48. Each mounting hole 66 is sized to slip over end 60 of bolts 56. In order to releasably lock visor 40 into position, and annular star gear 68 is mounted co-axially with each hole 68 on a side of end portions 44 which faces lateral edges 16. Complimentary annular star gears 70 are affixed co-axially with ends 60 of bolts 56 and face star gears 68 for engagement therewith.

The mounting of end portion 44 of visor 40 is shown in enlarged detail in FIG. 5. Here, it may be seen that bolt 56 extends through holes 55 and 57 in flange 52 of edge portion 16 and is secured in position by means of nut 58. Distal end 48 of end portion 44 mateably engages end 60 of bolt 56 by receiving bolt 56 through mounting hole 66 therein. Enlarged mounting nut 62 then threadably receives end 60 of nut 56 in threaded bore 64. When tightened, nut 62 deflects end portion 46 and forces star gears 68 and 70 together so that they become engaged and non-rotatable in respect to one another.

Figure 2:
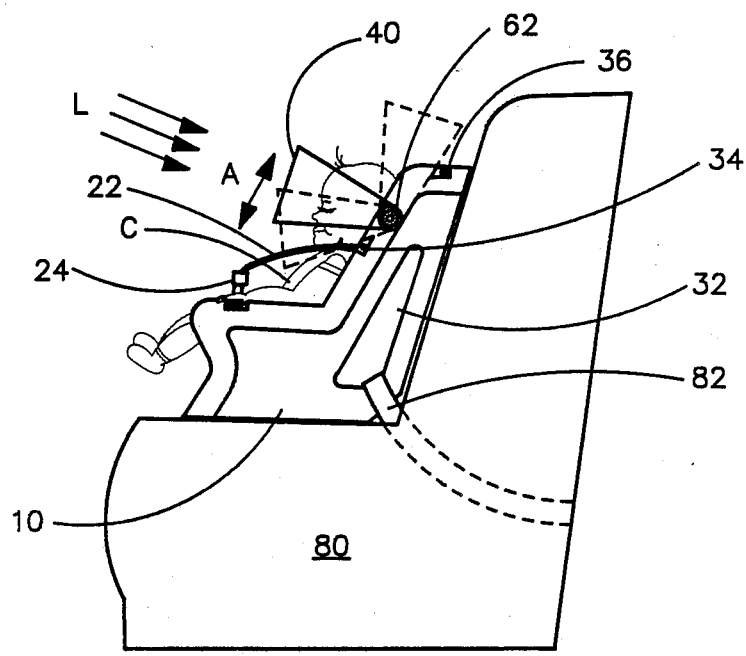
FIG. 2 is a side-view and elevation showing the protective child seat shown in FIG. 1 receiving a child therein supported and secured to a car seat.

With reference to FIGS. 1 and 2, then, it may now be more readily understood that protective seat 10 may be positioned on a vehicle seat 80 and secured thereon by the standard restraining belts, such as seat belt 82. A child, such as child C, may be received in and supported by the protective seat and may be retained therein by the child restraining means including belts 22 and body pad 24. Visor 40 is U-shaped in construction and thus extends over the infant with central portion 42 being spaced apart relation over the child C. As shown in phantom in FIG. 2, the combination of the star gears and nuts 62 allow visor 40 to be selectively orientated at different positions relative to the shell which supports child C. While simple frictional securing of visor 40 into a selected position is within the scope of the present invention, star gears 68 and 70 provide a positive positional lock. Further, in order to prevent visor 40 from tilting down to pinch and bind against the child's body and arms, a lower limit stop means in the form of block 34 is formed on one or more of lateral edges 16. If desired an upper limit stop in the form of block 36 may be provided as well. Accordingly, it should be appreciated that visor 40 may be tilted in the direction of Arrows A in FIG. 2 in order to protect the infant against incident light as represented by Arrows L in FIG. 2. It should accordingly be appreciated that visor 40 protects the child against strong incident light and flying objects while, at the same time permitting the child a view of his/her surroundings.

Figure 7:
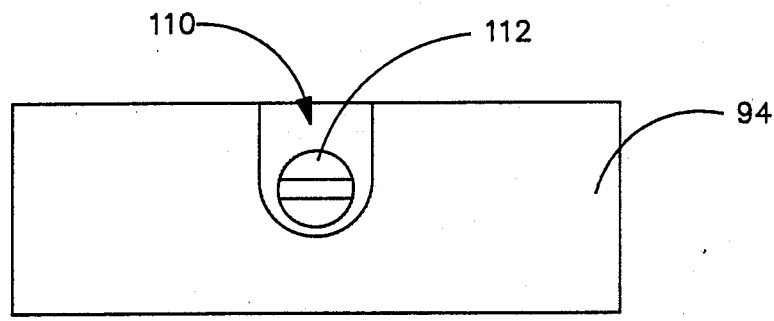
FIG. 7 is a back plan view of the bracket shown in FIG. 6.

The foregoing description has been directed to a protective seat manufactured to include the improvement according to the present invention. However, it is also possible to provide the present invention in the form of visor 40, as a retro-fit to existing protective seat apparatus. To accomplish this, the present invention contemplates the use of a mounting bracket, such as shown in FIGS. 6–9. Here, bracket 90 is formed as an elongated U-shaped bracket having a front wall 92 and a back wall 94 which are joined to one another by means of a bottom wall 96. Front and back walls 92 and 94 are thus separated by a channel 98 which is sized to receive a marginal web 154 of the flange 152 on a lateral side edge of the protective seat, as described more thoroughly below. Front wall 92 of bracket 90 is provided with a pair of mounting holes 102 adapted to threadably receive screws 104 and further includes a trunnion post 106 and an annular star gear 108 orientated co-axially with trunnion post 106. Back wall 94 has an interior scored surface 100 and is provided with slot 110 which, as best shown in FIG. 7, is formed to allow insertion of a bolt 112 which forms trunnion post 106. To this end, bolt 112 is threadably received in star gear 108 so that star gear 108 acts as a mounting nut for bolt 112.

Figure 8:
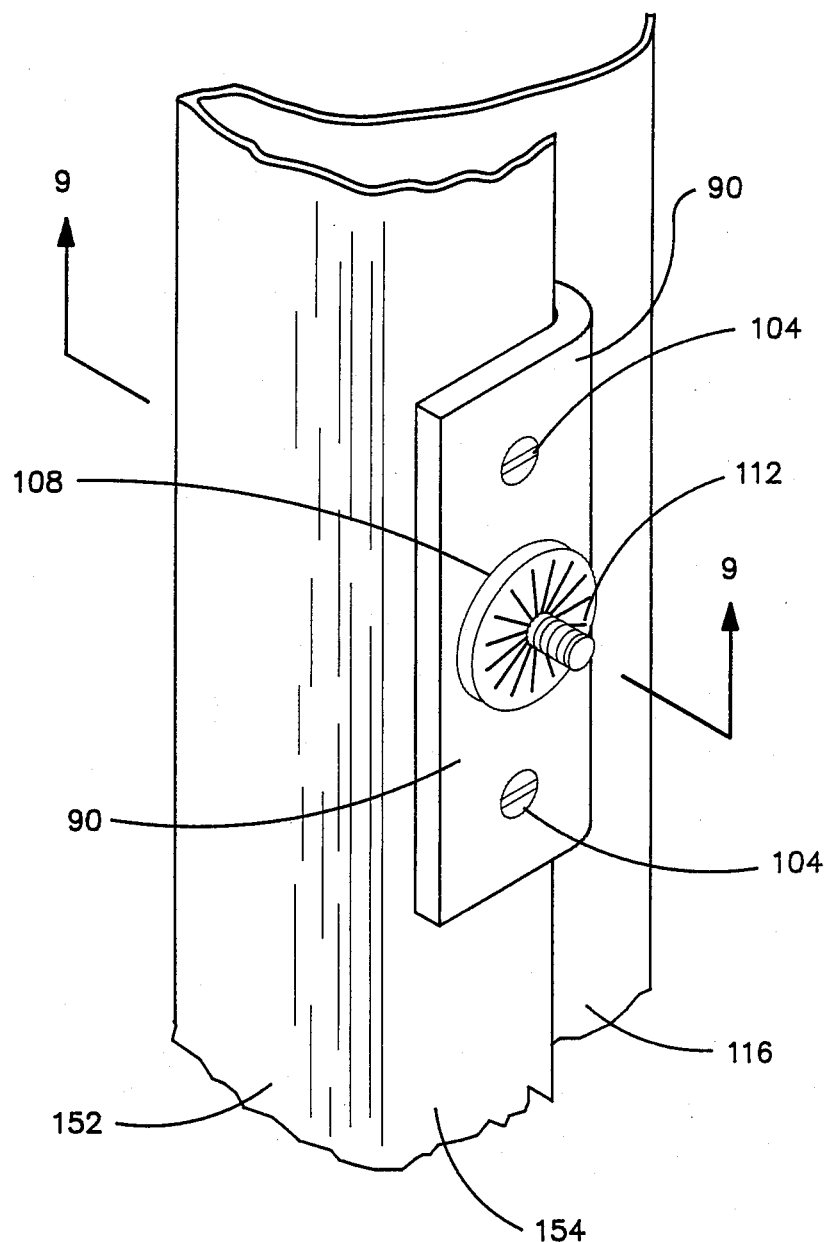
FIG. 8 is a prospective view of the bracket shown in FIGS. 6 and 7 in an attached condition on an existing child protective seat according to the present invention.
Figure 9:
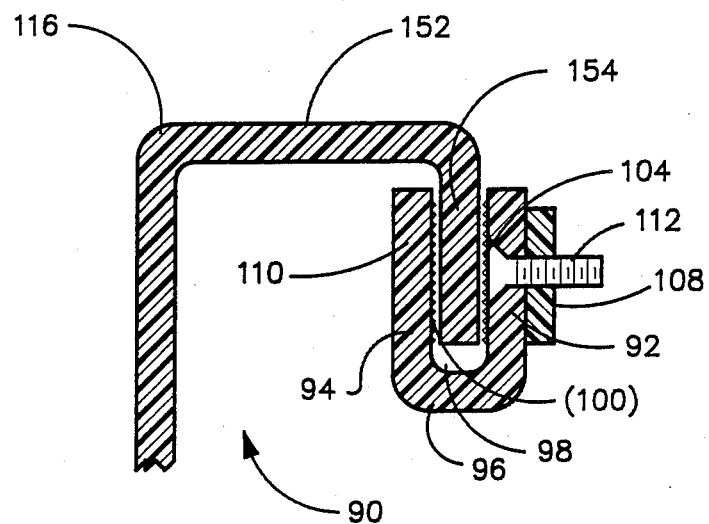
FIG. 9 is a cross-sectional view taken about lines 9—9 of FIG. 8.

As is best shown in FIGS. 8 and 9, lateral side edge portion 116 of a protective seat includes flange 152 that has downwardly depending web 154. Web 154 is received in channel 98 of bracket 90. Screws 104 may then be inserted to engage web 154 thereby moving scored surface 100 into abutting engagement with an inner surface of web 154. Scored surface 100 thereby increases the frictional engagement of bracket 90 so as to help prevent bracket 90 from sliding with respect to web 154. Bolt 112 and star gear 108 thus are positioned to receive an end portion of visor 40 in a manner described with respect to the preferred embodiment of the present invention.

Figure 10:
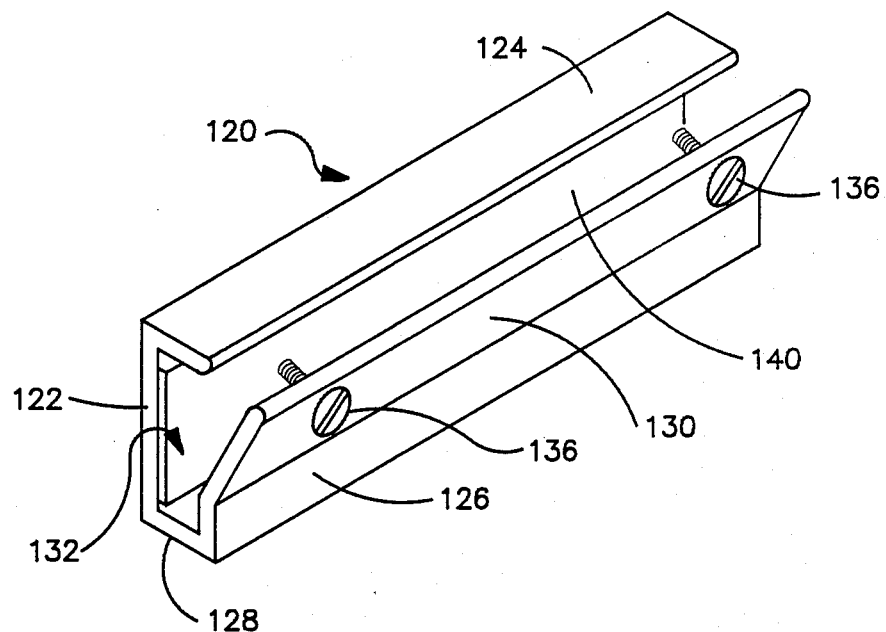
FIG. 10 is a prospective view of an alternate bracket assembly for use with an existing car seat.
Figure 11:
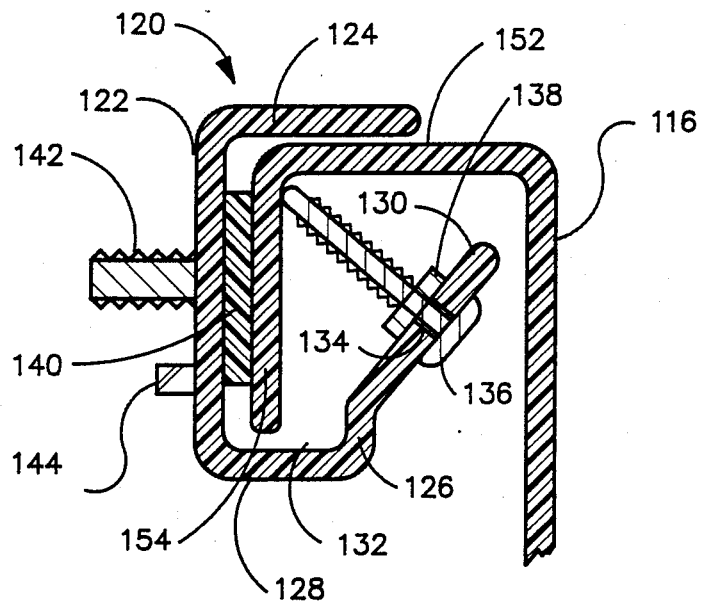
FIG. 11 is a cross-sectional view showing the attachment of the bracket assembly shown in FIG. 10 to an existing car seat.
Figure 12:
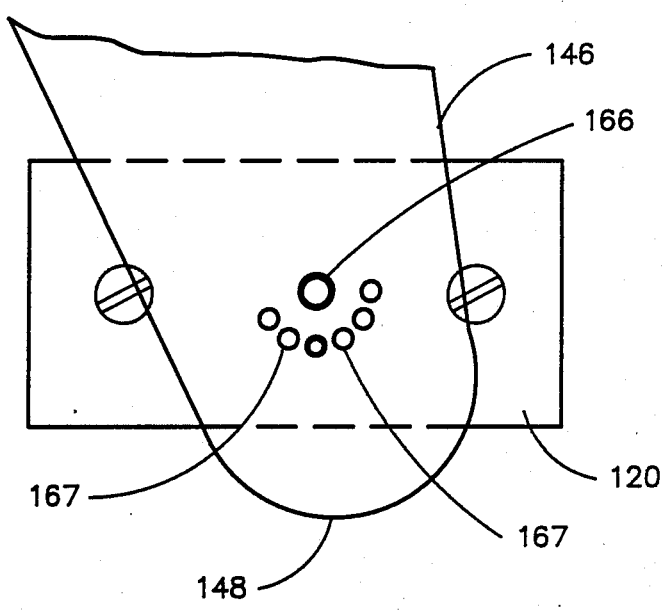
FIG. 12 is a front plan view showing the bracket of FIGS. 10 and 11 used with a modified visor assembly.

An alternate embodiment of a bracket is shown in FIGS. 10–12 for use with an alternate embodiment of a visor as described below. In FIG. 10, bracket 120 has a front wall 122 which terminates in an upper wall 124. Front wall 22 is connected to a shortened back wall 126 by means of a bottom wall 128, and an angled flange wall 130 is formed as an angular extension of back wall 126. Front wall 122, back wall 126 and bottom wall 128 form a channel 132 adapted to mount onto protective seat. As is shown in FIG. 11, lateral edge portion 116 of a protective seat has a flange 152 which includes a downwardly depending web 154 in channel 132. Front wall 132 is sized so that upper wall 124 and bottom wall 128 are spaced apart an amount equal to the width of web 154 so that it is closely received there between. Flange wall 130 is provided with a pair of holes, such as holes 134 through which bolts 136 extend and are threadably received on nuts 138 in order to mount bracket 120 on lateral edge 116. To this end an interior surface of front wall 122 is further provided with an adhesive layer 140 so that, when attached, adhesive layer 140 bonds web 154 to front wall 122 in conjunction with bolts 136 which are used to mount bracket 120. Bolts 136 may be tightened sufficiently to resiliently bias flange wall 130 against web 154 so as to maintain a constant clamping force holding bracket 120 on lateral side edge portion 116.

As is best shown in FIG. 11, bracket 120 is provided with a trunnion post 142 which is threaded to receive an enlarged mounting nut such as mounting nut 62 described with respect to the preferred embodiment of the present invention. While a star gear arrangement similar to that described with respect to the preferred embodiment of FIGS. 1–5 can be used, in the embodiment shown in FIGS. 10–12, a parallel mounting post 144 is formed integrally with front wall 122 in order to mount a modified visor as is shown in FIG. 12. In this figure, it may be appreciated that a modified visor has opposite end portions such as end portion 146 that has a mounting hole 166 located adjacent a distal end 148. A parality of mounting holes 167 are formed equal radial distances from mounting hole 166 with the radial distance between holes 167 and hole 166 being equal to the spacing between trunnion post 142 and mounting post 144. Holes 167 permit selective adjustment of the position of the modified visor whereby end portion 148 is mounted by placing mounting hole 166 over trunnion post 142 and selecting the engagement of mounting post 144 with a selected hole 167. When this is accomplished, an enlarged mounting nut may be threadably mounted on trunnion post 142 so as to lock end portion 48 in the engaged position. To this end, it should be appreciated that mounting post 144 has a height that is slightly less then the thickness of end portion 148 of the modified visor. Further if a limit stop is desired, an addition auxiliary bracket block or blocks can be mounted on the lateral side edge portions.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. In a protective seat for children adapted to be secured on a seat of a vehicle by releasable restraint belts of the vehicle, said protective seat including a support shell having longitudinal length and transverse width, said support shell operative to receive and support a child during travel, a support frame positioning and supporting the support shell on a seat of the vehicle and child restraining means releasably securable about a child received by the support shell for keeping the child in the protective seat apparatus in the event of a collision, sudden stop of the vehicle and the like, said support shell having a seat portion, a back portion and lateral side edge portions, the improvement comprising a visor including a central portion and opposite end portions with each said end portion having a mounting hole and mounting means on each lateral side edge portion, each said mounting means for mounting each end portion to the protective seat apparatus and including a mounting post projecting laterally outwardly from the protective seat apparatus and a securing member releasably received and secured on the respective mounting post whereby each mounting post is matably received by a respective mounting hole so that the end portions engage the mounting post and each end portion is retained in a selected position with said central portion extending across the support shell in spaced part relation thereto so that the central portion is positioned over a child placed in said protective seat.

2. The improvement of claim 1 wherein said visor is constructed to a high impact plastic material.

3. The improvement of claim 2 wherein said visor is transparent.

4. The improvement of claim 3 wherein said visor is operative to shield the infant from excessive incident light, said plastic material being tinted to reduce the amount of incident light transmitted therethrough.

5. The improvement of claim 3 where said visor is coated with a light reducing material.

6. The improvement of claim 1 including positive locking means for permitting selective orientation and positive positive of said visor at different positions relative to said shell and the infant placed therein.

7. The improvement of claim 6 including said positive locking means includes complimentary matable gear surfaces that engage each other to provide the selective orientation and positive positioning of said visor at a selected orientation.

8. The improvement claim 1 wherein said central portion extends transversely across the support shell and is a rectangular panel having a length approximately the same as transverse width of said support shell, said end portions formed integrally with said central portion at an obtuse angle with respect thereto whereby said end portions have distal ends spaced from one another a distance greater than the transverse width of the support shell, said visor formed of a resilient material so that said end portions are deflected toward one another when mounted to the protective seat whereby said visor is placed in tension.

9. The improvement of claim 1 wherein said mounting includes a pair of brackets, there being a bracket mounted to each of said lateral edges of said support shell, each said end portion being connected to a respective one of said brackets.

10. The improvement of claim 1 wherein said mounting means includes a pair of mounting nuts which threadably receive the respective mounting posts, each said nut operative to secure the end portions to the mounting means.

11. A protective seat for children adapted to be secured on a seat of a vehicle by releasable restraint belts of the vehicle to protect a child in the event of a collision, sudden stop of the vehicle and the like, comprising:

a support shell operative to receive and support a child during travel, said support shell having a seat portion, a back portion and lateral side edge portions;

a support framework connected to said support shell and operative to position and support said support shell on a seat of the vehicle;

belt receiving means on at least one of said support shell and said support framework for receiving said releasable restraint belts to secure said protective seat on the seat of the vehicle;

child retraining means releasably securable about a child received in the support shell for keeping the child in the infant seat apparatus;

a visor including a central portion and opposite end portions with said end portions having a mounting hole, said visor dimensioned to extend across the support shell and over a child placed therein and operative to shield the child from excessive incident light and flying objects;

mounting means including first and second trunnion posts projecting laterally outwardly and opposite one another on respective side edge portions for mounting said visor to one of said support shell and said support framework; and a first and second securing means received on a respective post for securing the respective end portion thereon, whereby said visor is retained in a selected orientation with respect to the infant seat apparatus.

12. A protective seat for children according to claim 11 wherein said visor has a central portion and a pair of end portions found integrally therewith to form a U-shaped structure, said end portions having distal ends mounted to said support shell.

13. A protective seat for children according to claim 12 wherein each said distal end is mounted to a respective lateral side portions edge of said support shell.

14. A protective seat for children according to claim 11 wherein each lateral side edge portion has formed marginal web, said mounting means including a pair of brackets, each said bracket operative to grip a respective marginal web to retain the respective bracket thereon and including mounting elements operative to mount a respective end portion to a respective bracket.

15. A protective seat for children according to claim 14 wherein said marginal webs each has a marginal web surface and each said bracket has a bracket surface that engages a respective marginal web surface, and including gripping means for increasing engagement between each associated pair of marginal and bracket surfaces.

16. A protective seat for children according to claim 15 wherein at least one of said marginal and bracket surfaces of each said associated pair is scored to define said gripping means.

17. A protective seat for children according to claim 15 wherein said gripping means includes an adhesive layer between the marginal surface and the bracket surface of each said associated pair.

18. A protective seat for children according to claim 14 including means for permitting selective orientation of said visor at different positions relative to said shell and the child placed therein and releasable locking means for locking said visor at a selected orientation.

19. A protective seat for children according to claim 11 wherein said visor has a central portion extending transversely across said shell in spaced relation thereto and to the child placed therein and a pair of downwardly extending end portions mounted to the lateral side edge portions of the support shell and including releasable locking means for locking said visor at a selected orientation.

20. A protective seat for children according to claim 19 wherein each said lateral edge portion has a marginal web, said mounting means including a threaded mounting post on each said marginal web and a mounting hole formed in each respective end portion of the visor and a pair of mounting nuts threadably received on a respective post, each said mounting nut operative to secure a respective end portion between a respective marginal web and the respective mounting nut.

21. A protective seat for children according to claim 20 wherein said locking means includes a star gear structure on each marginal web coaxial with said mounting post and a complementary star gear structure each end portion coaxial with said hole whereby each said star gear structure engages a complimentary star gear structure when said mounting nuts secure said end portions.

22. A protective seat for children according to claim 20 wherein said locking means includes a locking post on at least one marginal web spaced a first distance from a respective mounting post and a plurality of locking holes each spaced radially from said mounting hole a distance equal to said first distance whereby said locking post will engage a selected locking hole to provide a plurality of discreet positions for said visor.

23. A protective seat for children according to claim 19 wherein said central portion moves toward and away from said seat portion and including lower limit stop means for limiting the proximity of said central portion to said seat portion at a maximum lower position of the visor.

24. A protective seat for children according to claim 23 including upper limit stop means for limiting the maximum upper position of the visor.

25. A protective seat for children according to claim 11 wherein said visor is constructed of a high impact plastic material.

26. A protective seat for children according to claim 25 wherein said visor is transparent.

27. A protective seat for children according to claim 26 where said visor is operative to shield the infant from excessive incident light, said plastic material including material operative to reduce the amount of incident light transmitted therethrough.

28. The improvement of claim 10 including a pair of enlarged mounting nuts each having a threaded bore hole that passes only partially through a central axis of the nut, whereby the received mounting post ends are captured by the nut.

* * * * *